United States Patent Office 3,367,793
Patented Feb. 6, 1968

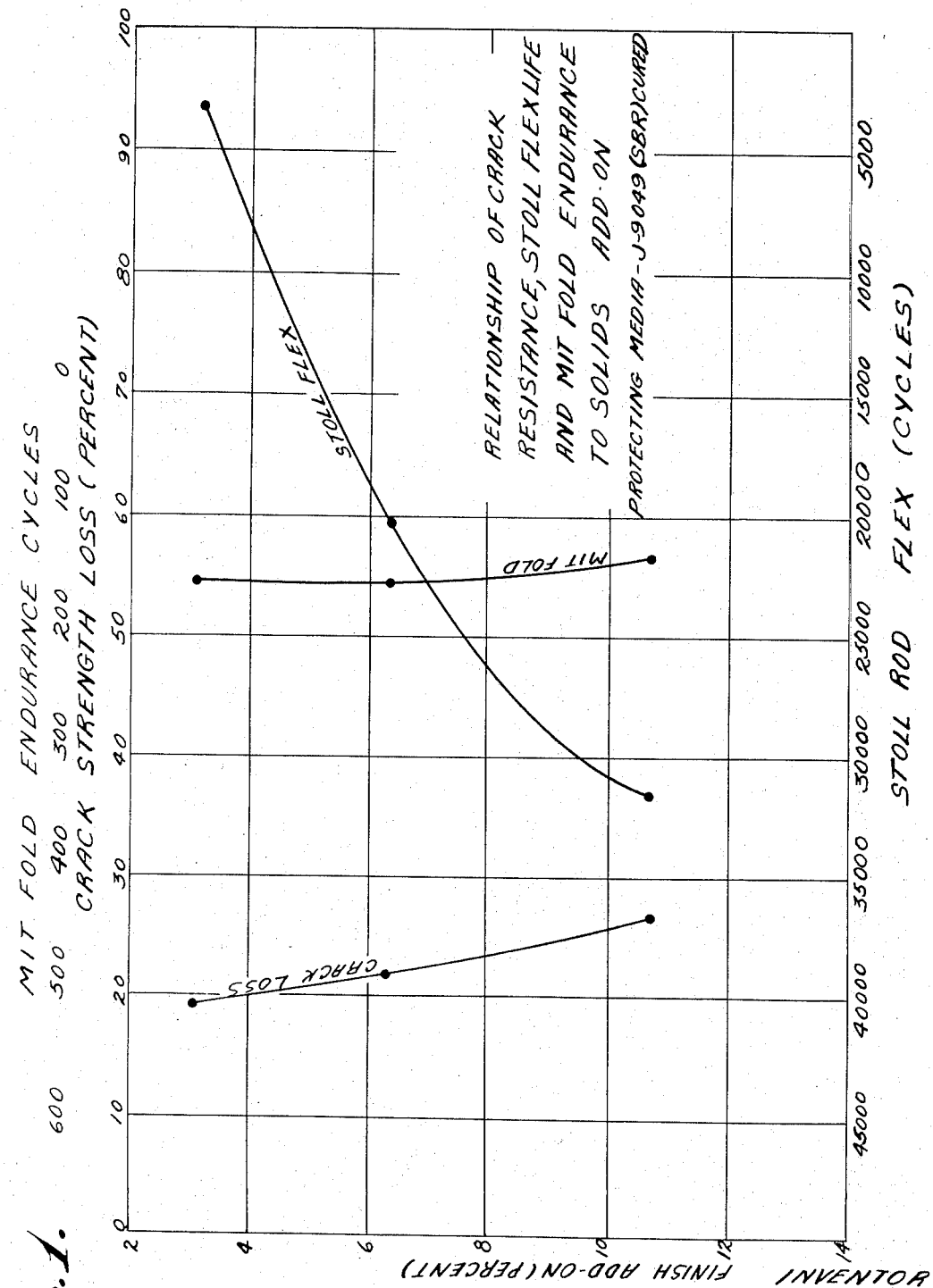

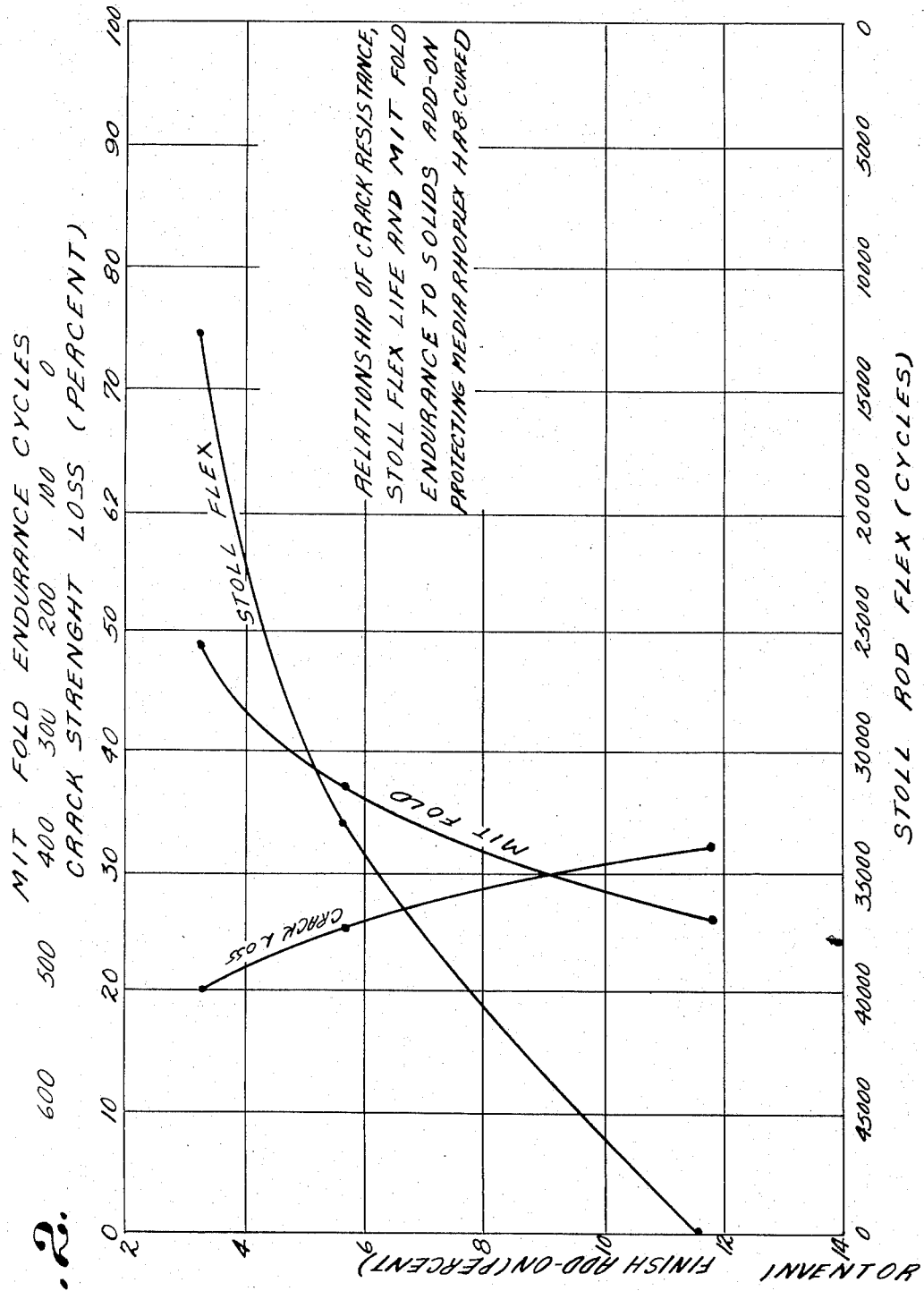

3,367,793
COATED GLASS TEXTILE AND PROCESS OF MAKING SAME
Everett C. Atwell, Greensboro, N.C., assignor to Burlington Industries, Inc., Greensboro, N.C., a corporation of Delaware
Filed Jan. 15, 1964, Ser. No. 337,786
15 Claims. (Cl. 117—76)

ABSTRACT OF THE DISCLOSURE

There is provided a glass textile product and a process for the production thereof. The glass fabric has an aminofunctional primer as a first coating thereon, a fiber protective medium coating and a tie coat composition whereby high bond strength between the glass textile and a rubber composition are obtained with increased resistance to cracking by flexure. The preferred compositions are: primer-amino-silanes, protective medium-styrene butadiene latex, tie coat-phenolic-formaldehyde/rubber latex.

---

The present invention is concerned with the treatment of glass surfaces, e.g. glass fibers, yarns, rovings, cord such as that used in tires, tapes and other types of fabrics (hereinafter referred to generically as glass textiles) for the purpose of improving their bonding characteristics and resistance to cracking, breaking and abrasion when folded or flexed.

Glass textiles of the type indicated have not been commercially feasible in certain areas of use for several reasons, notably, the high loss in tensile strength which results when the textile is creased or folded, generally low resistance to damage and breakage when abraded and the lack of suitable means for bonding to natural and synthetic rubbers. For example, it has previously been suggested that glass textiles might be useful in tire constructions, e.g. as tire cord, but this has not been practical because of the absence of any really suitable means for protecting the glass filaments in the fiber bundle from cracking or breaking when flexed or bent while simultaneously obtaining an effective bond between the cord and conventional rubber stocks.

Under the circumstances, the present invention contemplates the provision of certain novel treatments which may be used to give the following results:
(a) high bonds between the treated glass textile and rubbers, natural or synthetic;
(b) greatly increased resistance of the glass to cracking or breaking caused by flex fatigue, abrasion or the like; and
(c) a combination of (a) and (b) above for situations where the bonded textile will be subjected to flexing or bending actions such as occur in the case of tires.

Other objects and advantages of the invention will be apparent from the following detailed description.

Considering first the problem of bonding natural or synthetic rubbers to glass textiles, the invention contemplates treating the textile with an amino-functional primer and a phenolic-formaldehyde/latex composition, e.g. an aqueous resorcinol-formaldehyde/latex composition, to improve the bonding affinity of the glass with respect to rubbers. The amino-functional primer and the phenolic-formaldehyde/latex composition (hereinafter referred to as the tie coat or rubber tie coat for convenience) may be applied simultaneously to the textile. However, it is preferred to first apply the amino-functional primer followed by application of the tie coat as hereinafter described in detail.

By proper selection of the latex component for the tie coat composition, the dual primer system referred to above will give an outstanding bond between the glass and commercial rubber stocks to the point where in many instances the stock fails before peeling occurs indicating an adhesion between the glass and rubber greater than the cohesion of the rubber stock itself. This dual primer treatment may be all that is necessary in cases where the bonded product is to be used under rigid conditions, that is, conditions involving little, if any, flexing or bending. However, if the product is to be subjected to any significant degree of flexing, bending, surface abrasion or the like, as will usually be the case, the invention contemplates as a further feature the application of a polymeric fiber protective medium to the textile material before the tie coat composition is applied. This fiber protective medium apparently penetrates into the fiber bundles themselves and coats, lubricates or otherwise protects the individual fibers from abrading, etching or other like action which would occur during flexing and ultimately cause breakage.

Some of the best fiber protective media for use herein are found to have poor bonding properties with respect to the amino primer and tie coat composition. Accordingly, in order to use one of these media for fiber protective purposes, some agent or assistant having mutual bonding affinity for the tie coat and amino primer is necessary to establish an effective bond between the glass substrate and the rubber stock material to be laminated thereto.

More specific details are given below regarding the various aspects of the invention under the appropriate headings.

Amino-functional primer

The term "amino-functional primer" as used herein is intended to mean a compound which includes a reactive hydrogen on a primary or secondary amino group and which may be polymerized to give a high bond between glass and the tie coat composition. The preferred primers for use herein are hydrolyzable or hydrolyzed aminofunctional silanes which are at most only partially polymerized and contain one or more primary and/or secondary amino groups connected indirectly to the silicon atoms by means of one or more carbon atoms. However, other amino-functional materials, e.g. those classified as cation-active polyelectrolytes and cationic resinous compounds, may also be used in lieu of the silanes or in addition thereto.

Effective results are obtained with aminoalkyl trialkoxysilanes containing at least one amino group and up to about 10 carbon atoms, exclusive of those in the alkoxy groups attached to the silicon atom, each alkoxy group containing from 1 to 3 carbon atoms. Useful primary amino-functional silanes within this class may be represented by the formula:

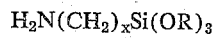

where $x$ is an integer from 1 to 8 and R is an alkyl containing from 1 to 3 carbon atoms. Representative of this type of silane is $H_2N(CH_2)_3Si(OC_2H_5)_3$.

While simple primary amino-functional aliphatic silanes of the above type give an improved bond, the best results are obtainable with aliphatic silanes containing one or more secondary groups or both primary and secondary groups. Typical examples of such compounds are those represented by the formula:

wherein $m$ and $n$ are integers from 1 to 4, preferably 2 to 3, R is an alkyl containing from 1–3 carbon atoms and $R_1$ is hydrogen, methyl or ethyl. This includes such silanes as N-(2-aminoethyl)-3-propylamino trimethoxy silane represented structurally as $$H_2N(CH_2)_2NH(CH_2)_3Si(OCH_3)_3$$

and commercially available as Z-6020; and N-(N-2-methylaminoethyl) - 3 - propylamino trimethoxy silane shown structurally as $$CH_3HN(CH_2)_2NH(CH_2)_3Si(OCH_3)_3$$

Another preferred group of silanes containing only one secondary amino group is represented by the formula:

$$R_1NH(CH_2)_3Si(OR)_3$$

wherein R is an alkyl radical containing from 1 to 3 carbon atoms and $R_1$ is an alkyl radical containing from 1 to 2 carbon atoms. As an example of such silanes, there may be mentioned N-ethyl-3-propylamino trimethoxy silane, $CH_3H_2NH(CH_2)_3Si(OCH_3)_3$.

Cation active polyelectrolytes or cationic resinous compounds which are also amino-functional and may be used herein in lieu of the silane, or in addition thereto, include the products known as Nalco 600 (National Aluminate Corporation) and QR-419 (Rohm & Haas). These products are chemically identifiable as low molecular weight water-soluble polyamine acrylamides, e.g. the reaction product of a low molecular weight polymethacrylate or polyethylacrylate with a polyamine such as triethylene tetramine, having two or more amino groups, at least one of which is a primary amino. This type of reaction product is disclosed in U.S. Patent 2,675,359. Molecular weights in the range of 2,000 to 5,000 may be mentioned as illustrative although products having higher molecular weights, e.g. 10,000 or above, may also be used. Other cationic resinous compounds useful herein include the water-soluble, cationic condensation products of formaldehyde and dicyandiamide or similar compound containing the grouping

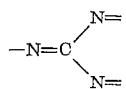

wherein the free valences are satisfied by hydrogen, lower alkyl, phenyl or other aryl radical. A typical example of such a condensation product useful herein is methylol guanidine.

The amount of amino-functional primer applied to the textile will depend, in any particular case, upon the textile construction, e.g. the type of fabric or weave, involved, the nature of the primer, etc. In the case of aminosilanes, a significant improvement is realized with as little as 0.03% by weight of silane (based on the weight of textile). The optimum amount for any particular case can be readily determined and will not usually exceed 0.5% by weight. Use of more than the optimum amount is wasteful, causes stiffening and loss of strength when folded and may result in some lowering of the final adhesion.

*Tie coat composition*

The tie coat used herein comprises an aqueous solution or emulsion of phenolic-formaldehyde reaction product and one or more rubber latices. The phenolic-formaldehyde reaction product is advantageously a water-soluble resorcinol-formaldehyde (resole) reaction product. However, the resorcinol may be replaced completely or in part by some other phenolic compound that will give a product with formaldehyde which is heat reactive, water-soluble or emulsifiable and compatible with the latex involved. Thus, for exampe, there may be mentioned catechol and tertiary butyl phenols as substitutes for the resorcinol.

Commercially available water-soluble or water-emulsifiable phenolic-formaldehyde reaction products wherein the phenolic component is something other than resorcinol, include those known as Synco 386N, 721, 550 and 6344; Durez 14798; GE 12353 and Catovar 170. Some of these reaction products are colorless and offer this as an advantage over the resorcinol-formaldehyde reaction products which tend to somewhat color the treated textile.

The latex utilized in the tie coat may be a latex of natural or synthetic rubber or mixtures of any such latices. Typical synthetic rubber latices include those wherein the rubber is butadiene-styrene copolymer, acrylonitrile-butadiene-styrene terpolymers, butadiene-styrenevinyl pyridine terpolymers, butadiene-acrylonitrile copolymers, or neoprene (polymerized 2-chlorobutadiene 1,3). One or more of these synthetic rubber latices and/or natural rubber latex may be mixed with other latices to obtain special effects or characteristics in the final product.

The latex or latex mixture selected for use in any particular situation will depend on the type of material to which the treated textile is to be subsequently bonded. For example, when the textile is to be bonded to sheets or coatings of natural rubber or a synthetic rubber of the styrene-butadiene type, the latex is preferably a butadiene-styrene-vinyl pyridine terpolymer latex with or without the addition of butadiene-styrene copolymer latex and/or natural rubber latex. When neoprene rubber is to be bonded to the treated textile, the latex is preferably a neoprene latex while for buna N bonding, a butadiene-acrylonitrile copolymer latex is preferred. Similarly, optimum bonding is obtained with a neoprene latex, with or without the addition of butadiene-styrene copolymer latex, when the textile is to be bonded to chlorosulphonated polyethylene (Hypalon) or butyl rubber.

Suitable resorcinol-formaldehyde/latex compositions for use herein are described in U.S. Patents 3,060,070 and 3,060,078 and copending applications Ser. Nos. 68,145, 70,428, 70,917, 121,366 and 121,367, now United States Patent Nos. 3,240,659, 3,240,649, 3,240,650, 3,240,660 and 3,240,651 respectively, the contents of which are incorporated herein by reference.

*Fiber protective medium and bonding assistant*

A variety of polymeric materials may be used as the fiber protective medium. Some of these materials have sufficient bonding affinity for the amino-functional primer and particular tie coat compositions to maintain the desired level of adhesion between the glass textile and rubber bonded thereto. For example, it has been found that commercially available styrene-butadiene latex used as an intermediate coating between the amino-functional primer and a tie coat composition for bonding to natural rubber or styrene-butadiene rubber, e.g. a resorcinol-formaldehyde/latex composition where the latex is a butadiene-styrene-vinyl pyridine terpolymer latex, gives a very substantial increase in resistance to cracking and flex abrasion while at the same time maintaining essentially the same high degree of adhesion as that obtainable using only the amino-functional primer and the tie coat. Similarly, an intermediate layer of a neoprene latex will give highly improved resistance to cracking and flex abrasion when used between a layer of amino-functional primer and a tie coat suitable for bonding to neoprene rubber (i.e. one comprising a mixture of resole resin and a neoprene latex) while retaining a high level of adhesion between the glass and rubber.

Other polymeric materials may be used as the intermediate fiber protective layer in lieu of the styrene-butadiene or neoprene latex mentioned above. However, generally speaking, these materials have a relatively low bonding affinity for the amino-functional primer and/or the tie coat. Accordingly, as indicated above, it is necessary under such circumstances to apply a coating of another polymer material (hereinafter referred to for convenience as a bonding assistant) which has sufficient mutual bonding affinity for the fiber protective medium on the one hand and the tie coat on the other to give the desired degree of adhesion in the final product. Typical of the polymeric materials which may be used herein to protect the glass fibers but do not by themselves demonstrate adequate bonding affinity to the amino-functional primer and tie coat are the polyurethanes such as Nopcothane 200 and Impranil; vinyls exemplified by the externally plasticized polyvinyl acetates, polyvinyl chlorides or vinyl acetate-vinyl chloride copolymers, e.g. the commercial product Geon 576 (B. F. Goodrich Chemical Co.); and acrylic resins such as the non-ionic, acidic acrylic emulsions or dispersions available as Rhoplex HA-4 and HA-8 (Rohm & Haas). Of the last-mentioned acrylics, the HA-4 product is a non-crosslinking polymer while the HA-8 is carboxylated and capable of crosslinking. Further details as to these and other acrylic systems suitable for use herein as the fiber protective medium are given in "Reactive Acrylics—A New Type of Textile Finishing Material" by Nuessle et al., American Dyestuff Reporter, vol. 50, Number 26, pages 13–21, dated Dec. 25, 1961.

The product known as Hycar 1312 (a low molecular weight butadiene-acrylonitrile copolymer with a medium high acrylonitrile content) also functions admirably as the fiber protective medium when applied to glass fabric previously coated with amino-functional primer in that it substantially increases the resistance of the treated textile to cracking when folded. However, when the thus treated textile is coated with a Buna N tie coat composition, the resulting adhesion between the Buna N and glass substrate is substantially and undesirably lower than the adhesion obtainable using only the amino-functional primer and appropriate tie coat. Accordingly, in this particular situation, if there is to be subsequent bonding to Buna N, it is essential to apply a further coating of a bonding assistant which has adequate bonding affinity for the tie coat to be used and the fiber protective medium. A typical example of a suitable bonding assistant for use in such a system is a carboxylated styrene-butadiene rubber containing 55% styrene and 45% butadiene and about 1% carboxylating acid (e.g. Lotol GX 1602, Naugatuck Chemical). This latex has a high surface tension (45 dynes) and when applied over the fiber protective medium remains essentially on the surface of the glass. Significant penetration of the bonding assistant into the glass fibers is generally undesirable since it conflicts with the function of the fiber protective medium and may negate its effects.

In contrast to the bonding assistant, the fiber protective medium should be such that it thoroughly penetrates into the bundles of glass fibers to surround or coat the individual filaments. It is not certain how this medium functions to give the desired increase in resistance to cracking or breaking upon flexing but, as indicated earlier, it appears that the medium functions as a lubricant or separator film for the individual filaments. In any case, it is preferably that the particle size for polymer latices used as the protective medium should be small enough to thoroughly penetrate the area between the individual glass fibers. Usually, the polymer particle size will be below 1500 Angstrom units with something in the area of about 400–1000 Angstroms preferred.

It will be appreciated that in the event a glass textile having optimum resistance to cracking and flex abrasion is desired and the product is not to be subsequently bonded to a rubber, only the amino-functional primer and protective medium need be used, the bonding assistant and tie coat being omitted. In such event, silicones (e.g. Dow Corning 23) may be advantageously used as the fiber protective medium. Polyvinyl alcohols (e.g. Elvax), among others, may also be utilized for this purpose.

While it is usually possible to obtain highly satisfactory levels of adhesion and resistance to cracking without using a bonding assistant in the case of textiles treated with amino-functional primer, followed by the application of a styrene-butadiene latex or neoprene latex as the protective medium and the tie coat for bonding to natural rubber, styrene-butadiene rubber and neoprene, there may be circumstances which will justify using the bonding assistant prior to the tie coat in order to obtain even higher degrees of adhesion. In some situations, organic polyisocyanates such as polymethylene polyphenylisocyanate (PAPI) may be used for this purpose in lieu of, or in addition to, other materials, e.g. carboxylated styrene-butadiene.

The amount of fiber protective medium utilized may be varied and will depend on such other factors as the density of the fiber bundle, the specific materials involved and the results desired. Usually, however, from 1 to 5% by weight (dry solids add-on) of the protective medium is applied, based on the weight of the textile. The bonding assistant, if used, should be added in an amount sufficient to give the bond desired.

Glass composition and construction

The invention herein is useful with respect to glass textiles comprising any of the conventional types of glass, e.g. types G, DE, E and beta. The latter (beta) is characterized by fine diameter fibers and is preferred for use herein. Unless otherwise indicated, the examples given below relate to fabric woven with multifilament beta glass. It will be recognized that the specific results obtainable with the invention will depend to some extent on the specific construction of the fabric or other glass textile being treated. However, the improvements referred to herein are broadly applicable to all types and constructions of glass textiles, e.g. plain or twill weaves, rovings, etc.

In order to achieve maximum bond strengths, it is usually preferred that the fibrous glass substrate be substantially clean or desized. Any conventional desizing procedure may be used, typically, one of those described in U.S. Patents 2,633,428; 2,845,364; and 2,970,934. Greige or undesized textiles may also be advantageously treated according to the invention although, as indicated, optimum results are obtained with the cleaned textiles.

Rubbers bonded

The rubbers bonded to glass textiles treated in the manner described herein may be any of those known in the art. This includes, for example, conventionally compounded sheets and coatings of natural rubber or such known synthetic rubbers or elastomers as neoprene, butyl, nitriles (Buna N), styrene-butadiene (SBR), acrylonitrile-butadiene-styrene (ABS) and the like.

Process details

While variations are possible, preferred operations involve first applying the amino-functional primer to the textile from an aqueous solution (usually a solution containing 1–2% by weight of the primer). This is preferably accomplished by immersing the textile and removing excess liquid by passing the fabric through the nip of a pair of pad rolls, followed by drying to remove water. Any drying temperature may be used, e.g. ambient temperature up to 350° F., so long as substantially all water is removed to give a dry fabric. The fiber protective medium, if used, is then applied in similar fashion followed by the application of the coating of bonding assistant, when the latter is needed. Thereafter, the tie coat is applied in one or more passes. The amount of tie coat solids deposited will vary depending on the weight and construction of the textile among other factors but usually 5–15% by weight of the textile will give maximum bonding.

After application of the tie coat composition to the textile, water is removed in a drying operation. If the amount of solids necessary to reach the adhesion level desired can be reached with a single application of the tie coat, drying temperatures are of no importance. If it is necessary to apply a second application, it is important to avoid fiber surface temperatures in excess of 220° F., in the first drying so as to avoid any crosslinking and conversion of the resorcinol-formaldehyde or the equivalent to the insoluble, infusible state to which a second application of tie coat would have poor wetting power and decreased potential for chemical coupling by cross linkage. The substantially moisture-free treated textile may be given a final cure for from 2-5 minutes at 320° F. or its equivalent at higher or lower temperatures. The textile treated as above described is characterized by its non-tacky, firm hand and can be rolled up and stored without the use of interliners for long periods of time provided it is kept out of contact with air, light and moisture (e.g. wrapped in a black polyethylene bag) without loss of its strong potential bonding properties to the type of elastomer material for which it was selectively prepared. This represents an outstanding advantage in commercial usage. Obviously, instead of storing, the primed textile may be bonded to an elastomer immediately following completion of the tie coat application.

The drying of coating material applied to hydrophobic substances such as glass from an aqueous medium is accompanied by migration of the coating material to the surface of the glass. This, of course, could leave the filaments in the fiber bundles relatively free of the desired coating material, e.g. the polymeric protective medium. Accordingly, in order to prevent such migration during drying and to insure uniform deposition, it may be advantageous to precipitate the medium, e.g. styrene-butadiene latex, by treating the textile while wet with the medium, with a spray or vapor of dilute aqueous acid such as acetic acid (typically 3 to 5% concentration) so that the latex (which is alkaline) is coagulated around the fibers. This acid treatment may also be employed, if desired, after impregnating the textile with the tie coat composition.

The various aspects of the invention are further described, but not limited, by the following examples wherein parts are by weight, unless otherwise indicated. The fabric used in all of these examples (identified as HG28/210) was constructed with 150/½ glass yarns in a plain weave with 42 ends and 32 picks per inch. The fabric width was 52 inches and it weighted 544 pounds per one thousand yards. In all instances, the fabric was thermally cleaned.

DUAL PRIMER SYSTEM—BONDING ONLY

EXAMPLE 1

*Preparation of primers*

Two amino-functional primers were prepared as follows:

*Primer #1*

| Component | Parts |
|---|---|
| Water | 99 |
| Nalco 600 | 1 |
| Total | 100 |

*Alternate primer #1*

| Component | Parts |
|---|---|
| Water | 99 |
| Dow Corning Z-6020 | 1 |
| Total | 100 |

The Nalco 600 was diluted with cold water, mixed well, and used in impregnating a cleaned glass fabric by immersion in the solution, excess primer being removed by passing the impregnated fabric through the nip of a 2-roll pad followed by drying at 220° F. A similar procedure was used to prepare and apply the alternate primer comprising the Z-6020 to another similar fabric.

*Tie coat*

A tie coat composition for bonding glass to compounded natural rubber, butadiene-styrene copolymer rubbers or mixtures thereof, was prepared as follows:

*Resole/latex Primer.—Part A*

| Component | Parts |
|---|---|
| Water | 169.4 |
| Sodium hydroxide (flake) | 0.5 |
| Resorcinol | 7.6 |
| 37% formaldehyde | 9.7 |
| Total | 187.2 |

*Part B*

| Component | Parts |
|---|---|
| 41% butadiene-styrene-vinyl pyridine latex | 248.0 |
| Resin solution (Part A) | 187.0 |
| 10% Triton X-100 solution | 12.0 |
| Water | 508.0 |
| Total | 955.0 |

Density of Part B: 0.9922, i.e. 8.33 #/gal.

*Preparation of Part A*

90% of the water for Part A was mixed with the caustic soda until the caustic was dissolved. The resorcinol was then added and dissolved by stirring. The formaldehyde and balance of the water were then added. The resulting mixture was aged for six hours under a controlled temperature of 80–84° F. At the end of six hours, the resulting resole resin solution (Part A) was used in the preparation of Part B as follows:

*Preparation of Part B*

The terpolymer latex, commercially available from General Tire and Rubber Co., as Gentac AC, from B. F. Goodrich Chemical Co., as Hycar 2518 and from Naugatuck Chemical Co., as Pyratex, was measured into a mixing tank. The Triton X-100 solution was added while stirring, followed by the water and the resin solution. The resulting mixture was ready for immedate use but may be stored for several days at room temperature and for longer periods of time under refrigeration.

EXAMPLE 2

The resole-latex primer of Part B, Example 1 was prepared as indicated but Part A was prepared in two separate stages. First, a so-called "arrested" resin solution was prepared using the following proportions:

| Component | Parts |
|---|---|
| Water | 73.5 |
| Sodium hydroxide (flake) | 4.5 |
| Resorcinol | 76.5 |
| 37% formaldehyde | 32.5 |
| Total | 187.0 |

This "arrested" resin solution was prepared by first adding the water to a suitable tank or drum. The NaOH flakes were added and dissolved followed by the addition and dissolution of the resorcinol. Thereafter, the formaldehyde was added. This addition is accompanied by an exothermic reaction necessitating some provision for cooling the container to prevent boiling. This "arrested" resin solution may be stored for an indefinite time without change in physical or chemical constitution as compared to a useful life of not more than twenty hours for the Part A composition of Example 1.

The required amount of the "arrested" resin solution (18.7 parts) was transferred from the storage drum to a tank. 37% formaldehyde (6.45 parts) and water (162 parts) were mixed and added to the resin solution in the tank.

This mixture was aged for from 1–6 hours at 80°–84° F. Following the aging step, it was used as Part A in making Part B of Example 1.

EXAMPLE 3

This example describes the preparation of a tie coat suitable for use herein to bond compounded neoprene coatings to glass.

Part A

The resin solution of Part A, Example 1 or the resin solution of Part A, Example 2 may be prepared as described and used in preparing Part B of this example.

Part B.—resole/latex primer

|  | Parts |
|---|---|
| 55% du Pont neoprene latex #750 | 92.5 |
| 56.8% zinc oxide paste | 13.5 |
| Water | 107.5 |
| Resin solution, Part A | 116.7 |
| Total | 330.2 |

Preparation of Part B

The latex was measured and transferred to a mixing tank and slow agitation started. The zinc oxide paste was then added followed by all the water. When thoroughly mixed, the resin solution (Part A) was slowly added. The composition can be used at once but a slight improvement in bonding can be obtained by aging 12 to 16 hours under normal atmospheric conditions.

EXAMPLE 4

This example describes the preparation of a tie coat composition suitable for bonding butadiene-acrylonitrile copolymers such as Buna N, Hycar OR and the like, to glass textiles according to the invention:

Part A

The resin solution of Part A, Example 1 or that of Example 2 may be prepared as described and used in preparing Part B of this example.

Part B.—resole/latex primer

|  | Parts |
|---|---|
| 40% butadiene-acrylonitrile latex Hycar (1571 or 1577) | 113.0 |
| 10% Igepal CO-880 solution | 8.5 |
| Antifoam B (Dow Corning) | 3.3 |
| Water | 15.3 |
| Resin solution (Part A) | 290.0 |
| Total | 430.1 |

BONDING GLASS TO RUBBERS (DUAL PRIMERS)

EXAMPLE 5

The fabric of Example 1 previously primed with the Nalco 600 primer as described, was run through the aqueous dispersion or emulsion of second primer prepared according to Example 2 (i.e. using the "arrested" solution) and then passed through pad squeeze rolls and dried at 220° F., to give a solids add-on of about 9%. A conventionally compounded natural rubber sheet (tire stock .040 inch thick) was then pressed into contact with the dual primed fabric and vulcanized at 290° F. for 30 minutes.

It had previously been ascertained that the adhesion between the unprimed fabric and the rubber sheet was only 1.5 pounds per inch width on a peel test when the test jaws were separated at a rate of 2" per minute. The adhesion using only the first primer of this example was 1.5 pounds per inch. Using only the second primer, a dry adhesion of 60-61 pounds per inch width was obtained but after immersing the product in water for 24 hours, the bond strength was only 7-8 pounds. In contrast, the fabric processed in the manner of this example using both primers as indicated exhibited dry and wet adhesions to the rubber of 77 and 36 pounds per inch width, respectively. Partial stock failure occurred when testing the wet adhesion of the dual primed product indicating that the rubber stock would break before the bond even after sustained wetting. Essentially equivalent results were obtained using the tie coat of Example 1 as the second primer.

When the process was repeated using the Z-6020 primer of Example 1 and the resole/latex primer of Example 2, the results were: 2.5 pounds (dry) for the Z-6020 primer only with dry and wet adhesions of 80 pounds and 52 pounds, respectively, for the dual primed system. Stock failure occurred under both wet and dry conditions for the dual primed system.

EXAMPLE 6

Example 5 was essentially repeated except that the tie coat primer was the tie coat of Example 3 and the dual primed fabric was pressed into contact with conventional uncured, unvulcanized neoprene sheet (neoprene GN green stock) and vulcanized at 280° F. for 60 minutes. In contrast to dry adhesions of 1.5, 1.5 and 28 pounds, respectively, using no primer, only the Nalco 600 primer and only the tie coat primer, the dual primed fabric processed according to the invention exhibited an adhesion of 60 pounds with stock failure. The corresponding figures using the Z-6020 primer alone and the two primers together were 2.5 and 47 pounds, respectively.

EXAMPLE 7

Example 5 was repeated (bonding to natural rubber) except that, in lieu of Nalco 600 or Z-6020 as the initial primer, a commercially available water-soluble condensation product of guanidine and formaldehyde was used as the initial primer. The dual primed fabric demonstrated essentially the same adhesion improvement as shown with the dual primed products of Example 5.

EXAMPLE 8

Example 6 was repeated (bonding to neoprene rubber) using a water-soluble reaction product of dicyandiamide and formaldehyde (Primer X) as the first primer with the following results:

|  | Adhesion (p.p.i.) |
|---|---|
| Primer X alone | 1.1 |
| Primer X with tie coat | 20 |

It will be seen from the above examples that the dual primed system gives an exceptionally good bond between glass and natural or synthetic rubbers. The exact reason for this improvement is not understood but apparently there is some unique coaction between the two primers. In any case, the results obtained are unexpected, particularly in view of the nature of the results obtained using the primers separately. Thus, the silane alone does not significantly improve the bond over the unprimed material. A reasonably high dry bond may be obtained using only the tie coat, but this bond is destroyed or severely reduced when the laminate is wet. In contrast, it is possible with the dual primer system of the invention to obtain an optimum bond strength which is maintained without serious loss even on wetting. Bond strengths as much as nine times greater, or even more, than the bond obtained with the best single primer under dry and wet conditions can be obtained.

EXAMPLE 9

Three samples of cleaned woven glass fabric as aforesaid were treated with 1% Z-6020 and dried at 325° F., followed by two passes in tie coat composition and intermediate drying at 160° F. The tie coat compositions used for the three samples (A, B and C) were prepared in the manner described above using, as the latex, butadiene-styrene-vinyl pyridine terpolymer, butadiene-acrylonitrile and neoprene, respectively. The following adhesion results were obtained on bonding to the indicated elastomer:

Fabric A—51 SF—natural rubber.
Fabric B—61 SF—Buna N.
Fabric C—50—neoprene.

The SF referred to above in connection with the adhesion values indicates stock failure.

Fabrics A and C were cured after the final dry at 330° F. for 2–3 minutes while Fabric B was dried without curing. When rolled up and protected in black polyethylene, the fabric samples retained their initial adhesion potential even on long standing.

EXAMPLE 10

While the dual primer system of the invention has been described above with particular reference to separate applications of the amino-functional primer and tie coat composition, it is possible to obtain effective results by combining the amino primer and tie coat and applying these materials together. This is shown by preparing the samples of HG28/210 fabric as follows:

*Sample A.*—Treated only with a tie coat according to Example 2 (resorcinol-formaldehyde/butadiene-styrene-vinyl pyridine terpolymer latex), dried at 160° F., cured at 330° F. for two minutes and bonded to conventional compounded natural rubber sheet;

*Sample B.*—Same as Sample A except initially treated with 1% Z–6020 and dried before application of the tie coat;

*Sample C.*—Same as Sample A except 1% Z–6020 included in the tie coat;

*Sample D.*—Same as Sample A but using a neoprene tie coat according to Example 3 and bonding to compounded neoprene sheet;

*Sample E.*—Same as Sample D except initially treated with 1% Z–6020 and dried before application of the tie coat;

*Sample F.*—Same as Sample D except 1% Z–6020 included in the tie coat.

Wet and dry adhesion results with percent loss of adhesion after wetting by immersing the laminated adhesion test piece in water for from 16–24 hours and then testing for adhesion are tabulated below:

| Sample | Adhesion | | Percent Adhesion Loss After Wetting |
|---|---|---|---|
| | Dry | Wet | |
| A | *48 | 11.5 | 75 |
| B | *58 | *53.5 | 7.8 |
| C | *57 | *48.5 | 14.9 |
| D | 38.5 | 9–20 | 80–48 |
| E | 50 | 51 | 0 |
| F | 51 | 50 | 2 |

*Stock failure.

It will be seen from the data tabulated above that the simultaneous application of the amino-functional primer and tie coat also gives good adhesion between the treated fabric and rubbers, the adhesion being substantially retained even after wetting. The substantial loss in wet adhesion for the systems using only tie coat (Samples A and D) is also apparent from the above data. Thus, it will be noted that the percent adhesion loss for products prepared according to the invention ranges from 0 (Sample E) up to 14.9% (Sample C—simultaneous application of Z–6020 and tie coat) whereas the percent adhesion loss for products using only the tie coat runs from nearly half to all of the dry adhesion (48–80% loss).

TERNARY PRIMER SYSTEM

Ternary primer systems comprising the amino-functional primer for the textile, the tie coat for the rubber and the intermediate fiber protective medium which provide both effective bonding and improved resistance to cracking or breaking on flexing or folding the treated textiles are shown in the following examples. Tests utilized herein to determine the resistance of the treated textile to loss of strength on folding and to failure on repeated flexing include:

(a) The Stoll Flex Abrasion test, a well-known way of determining resistance to flex abrasion by measuring the number of cycles a sample may be flexed around a bar or rod before breaking (ASTM Standards on Textile Materials 1962 D1175–61T Method B);

(b) The MIT fold test where, in essence, the number of times the treated fabric may be folded before breaking using an MIT fold fatigue tester is measured; and (c) The so-called crack resistance test where the test procedure involves rolling a four pound weight over the creased textile (1" sample) five times followed by restoring the textile to its original flat condition and placing the same in the jaws of a Scott tensile strength tester and observing the load required to cause breakage. The crack loss is computed from the difference in break strength between the original textile and the creased textile.

EXAMPLE 11

The thermally cleaned glass fabric HG28/210 was passed once through 1% Z–6020 with drying at 325° F. in one minute to provide about 0.2% primer add on. This was followed by two passes through 20% neoprene latex, coagulating the wet finish with a spray of 5% acetic acid in water and drying at 120° F. Solids add-on after the treatment with neoprene was 9–10%. The fabric was then passed once through a 20% tie coat composition using a neoprene latex (i.e. the product of Example 3) with and without acid coagulation, followed by drying at 220° F. and curing at 330° F. for 3 minutes. This gave a product having good adhesion to neoprene rubber with excellent crack and flex abrasion resistance. The total solids add-on was 13.5%. Results of adhesion, flex abrasion and crack strength tests on two samples of identical fabric processed in this way, one sample (X) with acetic acid coagulation and one (Y) without this treatment after the tie coat application were as follows:

| Neoprene Adhesion (p.p.i.) | Stoll Flex Abrasion Cycles | | Loss in Crack Strength, Percent | |
|---|---|---|---|---|
| | Bar | Rod | Warp | Filling |
| Sample X 37 | 1,237 | ---------- | 21 | 17 |
| Sample Y 25 | 901 | 398,571 | 29 | 11 |

Using only one pass through a 30% neoprene latex in lieu of two passes through 20% latex but otherwise identical conditions, gave the following results:

| Neoprene Adhesion | Stoll Flex Abrasion | | Loss in Crack Strength, Percent | |
|---|---|---|---|---|
| | Bar | Rod | Warp | Filling |
| Sample X 28 | 873 | 391,810 | 21 | 17 |
| Sample Y 27 | 877 | 478,395 | 21 | 10 |

The adhesions obtained in the above tests on Samples X and Y compare favorably with those obtainable without the intermediate coating of neoprene latex for fiber protection purposes. At the same time, however, flex abrasion resistance is markedly improved (e.g. 3 to 10 times greater) and loss in crack strength by folding is substantially reduced when compared to the corresponding product omitting the fiber protective medium. Anything under 35% loss in crack strength, which is approximately the loss occurring in the untreated textile, is considered to be a highly useful improvement and it will be noted that each of the foregoing samples satisfies this condition while retaining a high degree of adhesion for neoprene rubber. Without the intermediate neoprene fiber protective coating, the loss in crack strength is extremely high, e.g. 80% or even more up to 100% loss.

EXAMPLE 12

Fabric HG28/210 was passed once through 1% Z–6020, dried at 325° F. in one minute to provide about 0.2% add-on. This was followed by two passes through 20% styrene-butadiene latex (J–9049, Naugatuck Chemical), acid coagulating the wet fabric with a spray of 5% acetic acid in water and drying at 120° F. Thereafter, the fabric was passed once through a 20% tie coat composition wherein the latex was styrene-butadiene-vinylpyridine terpolymer latex prepared as in Example 2, followed by drying at 220° F. and curing at 330° F. for 3 minutes. The adhesion to natural rubber was 49 p.p.i.; and Stoll flex abrasion readings were 1006 and 94,151 cycles on the bar and rod, respectively, with a loss in crack strength of 32% and 4.5% in the warp and fill, respectively.

When only one pass through 30% J–9049 was used in lieu of two passes of 20% J–9049, the adhesion dropped somewhat to 23 p.p.i., still a highly useful figure while the loss in crack strength was 26% and 4.6% for the warp and filling, respectively. A Stoll bar reading of 643 cycles also indicated substantial protection of the glass fibers by means of the J–9049.

EXAMPLE 13

Fabric HG28/210 was passed through 1% Z–6020, dried at 325° F. in 1 minute. The fabric was then passed through 40% (solids) styrene-butadiene latex (J–9049) followed by two passes through tie coat composition according to Example 2 (terpolymer latex). After the intermediate styrene-butadiene latex (SBR) treatment and each pass with the tie coat composition, the fabric was dried at 160° F. for two minutes with curing at 330° F. for two minutes after the last drying. Solids add-on, which is cumulative throughout this description, amounted to 11.5%, 14.2% and 16.0%, respectively, after the three latex passes. Acid coagulation (5% acetic acid spray) was used after the intermediate SBR pass.

The fabric processed as above was tested for air diffusion in the manner shown in U.S. Patent 3,034,336 using unvulcanized compounded natural rubber tire stock for laminating to the fabric, and curing the assembly in the mold under normal curing conditions. The resulting specimen tested according to 3,034,336 showed no leakage of air along the axes of the individual yarns comprising the fabric at air pressures of 30 p.s.i. and 100 p.s.i. thus indicating the complete filling of the voids or air spaces in the fiber bundles with the solids applied. An adhesion test as previously employed gave 61 p.p.i. (stock failure) representing optimum adhesion. Stoll flex abrasion readings were 585 and 33,907 cycles, respectively, on the bar and rod. Percent loss in the crack strength test was below 30% and the MIT fold test indicated sufficient resistance to cracking or breaking when folded to warrant use in tire construction.

Repeating the above example but omitting the last tie coat pass and the acid coagulation step, the adhesion was somewhat lower (31–39 p.p.i.) but there was still no leakage of air.

In a series of further tests using 10–40% styrene-butadiene latex as the intermediate coating and 1–3 passes of the tie coat composition, high adhesions to natural rubber, with and without the acid coagulation step, were obtained. Excellent results were also obtained on the flex abrasion, crack strength and MIT fold tests. The use of the acid coagulation step appeared in certain cases to favor higher adhesions than obtainable without the coagulating step although in both instances, highly useful adhesions were realized. Non-air permeability is improved with the acid coagulation step in this particular series of tests using the fabric construction indicated. The use of higher concentrations (30–40% solids) for the SBR latex appeared to facilitate the preparation of a non-air permeable product. Flex abrasion resistance in this series improved with increased dry solids add-on up to an optimum at about 16% add-on. Thus, for example, one pass through 40% SBR latex and two passes through 20% tie coat with intermediate acid coagulation and drying (16% total solids add-on) produced a fabric showing a maximum of 585 cycles for bar flex abrasion while the use of two passes of 20% SBR latex and two passes of 20% tie coat (14.7% total add-on) gave 563 cycles.

EXAMPLE 14

Thermally cleaned woven glass fabric (HG28/210) was passed through 1% aqueous Z–6020 and dried at 325° F. to give a solids add-on of 0.25%. The fabric was then passed through a 10% aqueous solution of Zytel 61 (alcohol/water soluble polyamide), dried at 160° F. to give an add-on of 9.6% and then passed through 20% tie coat composition according to Example 2 followed by drying at 160° F. An adhesion of 62 pounds (stock failure) to natural rubber and excellent Stoll flex abrasion results of 683 and 144,902 cycles on the bar and rod, respectively, were obtained. The loss of strength by folding on the crack test is high but the product is useful for end uses requiring high abrasion resistance and outstanding adhesion where folding through 360° would not be encountered.

QUATERNARY SYSTEMS

These systems are used where the fiber protective medium has poor affinity for the amino-functional primer and/or the rubber tie coat and thus gives a product having poor adhesion to the rubber. To return the adhesion to the desired high levels resulting from the use of the amino primer and tie coat, the system includes a bonding assistant. As noted earlier, the material selected for this purpose must have mutual bonding affinity for the filament protective medium and the tie coat. The following examples illustrate this embodiment of the invention:

EXAMPLE 15

Clean glass fabric HG28/210 was passed through 1% Z–6020, dried at 325° F. for one minute, passed through 10% Hycar 1312 (low molecular weight butadiene-acrylonitrile copolymer) as the intermediate fiber protecting medium with drying at 160° F. The fabric was then passed through a 20% Lotol GX–1602 (carboxylated styrene-butadiene rubber) and again dried at 160° F. Thereafter, the fabric was passed through a 20% tie coat composition prepared according to Example 4 for bonding to Buna N. After drying at 250° F., and curing at 300° F. for 3 minutes, the fabric was bonded to green compounded Buna N sheeting. An adhesion of 57 pounds was obtained with a 31% warpwise crack strength loss, a reading of 298 cycles on the MIT fold fatigue tester and 86 and 12,855 cycles for the bar and rod, respectively, on the Stoll flex abrasion test. This indicates that the product obtained herein demonstrated both outstanding adhesion and resistance to cracking or breaking when folded or flexed. Without the GX–1602 or equivalent bonding assistant, the adhesion is substantially and undesirably lower.

EXAMPLE 16

In lieu of the Hycar 1312 protective coating utilized in Example 15, there may be used, for example, the acrylic carboxylated cross-linking copolymer Rhoplex HA–8. The latter has no significant adhesion to Buna N tie coat compositions but the use of the GX–1602 coating or its equivalent gives an effective bond between the protective coating and the Buna N tie coat while retaining good resistance to cracking or breaking. Other useful quaternary systems include, for example, the Z–6020 primer, Nitrex 2616 (an acrylonitrilebutadiene copolymer) as the fiber protective medium; the polyisocyanate PAPI as the bonding assistant to regain adhesion lost by the Nitrex and a tie coat composition for bonding to natural rubber, butadiene-styrene rubber; acrylonitrile-butadiene rubbers, or the more recent acrylonitrile-butadiene-styrene rubbers (ABS).

FIGURES 1 and 2 accompanying this specification illustrate the relationship of Stoll flex life, MIT fold endurance and crack resistance to solids add-on. FIGURE 1 relates to thermally cleaned HG28/210 glass fabric treated in the manner of Example 12 using J–9049 styrene-butadiene latex for the protecting media. It will be noted that with a total solids add-on varying from about 3 to 11%, the crack loss in percent stays well below 30%. This is a highly desirable result. The Stoll rod flex life (cycles) is also outstanding even at the lowest solids add-on although it will be noted that the flex life increases with solids add-on until an apparent levelling off occurs. The MIT fold endurance data remains fairly constant and has an effective value of around 55 cycles regardless of the add-on. FIGURE 2 shows the corresponding curves obtained when the protective media is Rhoplex HA–8, rather than J–9049.

It will be appreciated that various other modifications may be made in the invention described herein. Hence, the scope of the invention is defined in the following claims wherein

I claim:

1. A process for improving the bonding characteristics of glass textiles for rubbers which comprise (1) applying to the said textiles an amino-functional primer selected from the group consisting of amino-silanes, and cationic polyelectrolytes selected from the group consisting of polyamine acrylamides, the condensation products of formaldehyde and dicyandiamine, and compounds of the formula

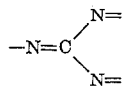

wherein the free valences are satisfied by hydrogen, lower alkyl and aryl groups, (2) applying a polymeric fiber protective medium selected from the group consisting of styrene-butadiene latex, neoprene latex, polyurethanes, polyvinyl acetates, polyvinyl chlorides, vinyl acetate-vinyl chloride copolymers, acrylic resins, butadiene-acrylonitrile copolymers, silicones and polyvinyl alcohols, and (3) applying a composition of phenolic-formaldehyde/rubber latex composition.

2. The process of claim 1 wherein the primer is applied in aqueous solution, the textile is dried after applying the primer and dried again after applying the fiber protective medium and a resorcinol-formaldehyde/latex composition is then applied followed by further drying.

3. The process of claim 2 wherein the textile is cured after said further drying.

4. The process of claim 2 wherein said primer is in aqueous solution and said composition is an aqueous, organic solvent-free composition.

5. The process of claim 1 wherein said primer is an amino-silane, said protective medium is a styrene-butadiene copolymer rubber and the said composition comprises phenolic-formaldehyde and styrene-butadiene polymer latex.

6. The process of claim 1 wherein a rubber is thereafter applied to said textile.

7. The process of claim 1 wherein after the application of said protective medium, a bonding assistant selected from the group consisting of carboxylated styrene-butadiene rubber and polyisocyanates is applied prior to application of said composition.

8. The process of claim 7 wherein said protective medium is a low molecular weight butadiene-acrylonitrile polymer and said bonding assistant is a carboxylated styrene-butadiene polymer.

9. The process of claim 8 wherein Buna N is bonded to the thus treated glass.

10. A glass textile having improved bonding characteristics, said textile having a first coating of an ammino-functional primer selected from the group consisting of amino-silanes, and cationic polyelectrolytes selected from the group consisting of polyamine acrylamides, the condensation products of formaldehyde and dicyandiamine, and compounds of the formula

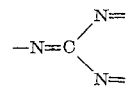

wherein the free valences are satisfied by hydrogen, lower alkyl and aryl groups, a second coating selected from the group consisting of styrene-butadiene latex, neoprene latex, polyurethanes, polyvinyl acetates, polyvinyl chlorides, vinyl acetate-vinyl chloride copolymers, acrylic resins, butadiene-acrylonitrile copolymers, silicones and polyvinyl alcohols and a third coating of a phenolic-formaldehyde/rubber latex.

11. A glass textile according to claim 10 wherein the third coating is a resorcinol-formaldehyde/rubber latex.

12. The textile of claim 10 wherein said primer is an amino-silane.

13. A glass textile having resistance to flex abrasion and cracking, said textile being coated with an amino-functional primer selected from the group consisting of amino-silanes, and cationic polyelectrolytes selected from the group consisting of polyamine acrylamides, the condensation products of formaldehyde and dicyandiamine, and compounds of the formula

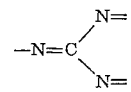

wherein the free valences are satisfied by hydrogen, lower alkyl and aryl groups, a fiber-protective medium selected from the group consisting of styrene-butadiene latex, neoprene latex, polyurethanes, polyvinyl acetates, polyvinyl chlorides, vinyl acetate-vinyl chloride copolymers, acrylic resins, butadiene-acrylonitrile copolymers, silicones and polyvinyl alcohols; and a composition of phenolic-formaldehyde/rubber latex composition.

14. The textile of claim 13 wherein said primer is an amino-silane.

15. A glass textile according to claim 13 wherein said primer is an amino-silane; the fiber protective medium is a low molecular weight butadiene-acrylonitrile polymer and there is disposed between the said fiber protective medium and the said composition a bonding assistant of a carboxylated styrene-butadiene polymer.

References Cited

UNITED STATES PATENTS

| | | | |
|---|---|---|---|
| 2,128,635 | 8/1938 | Charch et al. | 117—80 |
| 2,650,184 | 8/1953 | Biefeld | 117—76 |
| 2,675,359 | 4/1954 | Schneider | 260—2.1 |
| 3,046,295 | 7/1962 | Lisanke et al. | 117—126 X |
| 3,081,195 | 3/1963 | Biefeld et al. | 117—76 |
| 3,240,650 | 3/1966 | Atwell | 156—315 |
| 3,252,278 | 5/1966 | Marzocchi et al. | 117—126 X |
| 3,262,809 | 7/1966 | Aber | 117—76 X |
| 3,282,724 | 11/1966 | Atwell | 117—76 X |
| 3,287,204 | 11/1966 | Marzocchi | 117—126 X |

OTHER REFERENCES

Morton, Maurice, Introduction to Rubber Technology, Reinhold Pub. Corp., New York, November 1959, pp. 295–296 relied on. TS 189OM66 C.3.

WILLIAM D. MARTIN, *Primary Examiner.*

R. HUSACK, *Assistant Examiner.*